US010577985B2

(12) United States Patent
Taguchi

(10) Patent No.: US 10,577,985 B2
(45) Date of Patent: Mar. 3, 2020

(54) BOILER, COMBINED CYCLE PLANT, AND BOILER OPERATION METHOD

(71) Applicant: MITSUBISHI HITACHI POWER SYSTEMS, LTD., Kanagawa (JP)

(72) Inventor: Jun Taguchi, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 459 days.

(21) Appl. No.: 15/329,814

(22) PCT Filed: Sep. 2, 2015

(86) PCT No.: PCT/JP2015/074959
§ 371 (c)(1),
(2) Date: Jan. 27, 2017

(87) PCT Pub. No.: WO2016/047399
PCT Pub. Date: Mar. 31, 2016

(65) Prior Publication Data
US 2018/0202322 A1   Jul. 19, 2018

(30) Foreign Application Priority Data
Sep. 26, 2014   (JP) ................... 2014-197521

(51) Int. Cl.
*F01K 23/10*   (2006.01)
*F22D 5/36*   (2006.01)
(Continued)

(52) U.S. Cl.
CPC ............ *F01K 23/108* (2013.01); *F01K 11/02* (2013.01); *F22B 1/18* (2013.01); *F22D 5/36* (2013.01); *Y02E 20/16* (2013.01)

(58) Field of Classification Search
CPC ........ F01K 23/108; F01K 23/10; F01K 11/02; F22D 5/36
See application file for complete search history.

(56) References Cited

U.S. PATENT DOCUMENTS 10,006,313 B2 * 6/2018 Drouvot ................ F01K 17/025
60/39.12
2001/0037641 A1 * 11/2001 Hannemann ............ F01K 23/10
60/39.12
(Continued)

FOREIGN PATENT DOCUMENTS

JP   61-213401   9/1986
JP   3-99101   4/1991
(Continued)

OTHER PUBLICATIONS

JP-6058161-B English Translation (Year: 1994).*
JP-2012140910-A English Translation (Year: 2012).*
(Continued)

*Primary Examiner* — Mark A Laurenzi
*Assistant Examiner* — Shafiq Mian
(74) *Attorney, Agent, or Firm* — Wenderoth, Lind & Ponack, L.L.P.

(57) ABSTRACT

The purpose of the present invention is to maintain the intake pressure of a water supply pump at an operable pressure. A boiler is provided with: condensate pumps (a condensate pump and an auxiliary condensate pump); a branch line that causes water delivered by the condensate pumps to branch; a drum (a low-pressure drum) that is connected to one (a low-pressure branch line) of two lines into which the branch line branches; and a water supply pump that is connected to the other (a high-pressure branch line) of the two lines into which the branching line branches and that pumps water to an evaporator (a high-pressure evaporator). The boiler is additionally provided with pressure applying means that guides a portion of the water in the drum to the water supply pump side when the intake pressure on the inlet side of the water supply pump has become lower than a predetermined pressure.

8 Claims, 3 Drawing Sheets

(51) Int. Cl.
*F22B 1/18* (2006.01)
*F01K 11/02* (2006.01)

(56) References Cited

U.S. PATENT DOCUMENTS

| | | | |
|---|---|---|---|
| 2002/0062639 A1* | 5/2002 | Tanaka | F01K 23/108 60/39.182 |
| 2004/0231332 A1* | 11/2004 | Saucedo | F23L 7/007 60/671 |
| 2010/0269515 A1 | 10/2010 | Kishi et al. | |
| 2010/0281877 A1* | 11/2010 | Asanaka | F01K 13/02 60/778 |
| 2011/0099972 A1* | 5/2011 | Yang | F01K 7/24 60/39.183 |
| 2011/0113786 A1* | 5/2011 | Rancruel | F01K 23/10 60/772 |
| 2012/0102962 A1 | 5/2012 | Sivasankaran et al. | |
| 2014/0216365 A1 | 8/2014 | Rancruel et al. | |

FOREIGN PATENT DOCUMENTS

| | | | | |
|---|---|---|---|---|
| JP | 5-10501 | | 1/1993 | |
| JP | 06-058161 | | 8/1994 | |
| JP | 6058161 B | * | 8/1994 | ................ F22B 1/18 |
| JP | 2012-117517 | | 6/2012 | |
| JP | 2012-140910 | | 7/2012 | |
| JP | 2012140910 A | * | 7/2012 | ............. F01K 11/02 |
| JP | 2014-5955 | | 1/2014 | |
| JP | 5448883 | | 1/2014 | |
| JP | 2014005955 A | * | 1/2014 | ............. F01K 11/02 |

OTHER PUBLICATIONS

JP-2014005955-A English Translation (Year: 2014).*
Written Opinion dated Dec. 8, 2015 in corresponding International (PCT) Application No. PCT/JP2015/074959.
International Search Report dated Dec. 8, 2015 in International (PCT) Application No. PCT/JP2015/074959.
Notification of Reason for Refusal dated Apr. 19, 2018 in Korean Application No. 10-2017-7002093, with Machine Translation.

* cited by examiner

BOILER, COMBINED CYCLE PLANT, AND BOILER OPERATION METHOD

TECHNICAL FIELD

The present invention relates to a boiler, a combined cycle plant, and a boiler operation method.

BACKGROUND ART

In the related art, for example, PTL 1 discloses a boiler in which steam supplied to a steam turbine is condensed by a condenser, the condensate is delivered to a drum or a water supply pump by a condensate pump, and water pumped by the water supply pump is delivered to an evaporator so as to generate steam.

In addition, for example, PTL 2 discloses a configuration in which an auxiliary condensate pump is connected in parallel so as to cope with a case where a condensate pump in operation stops due to some causes.

CITATION LIST

Patent Literature

[PTL 1] Japanese Patent No. 5448883
[PTL 2] Japanese Unexamined Patent Application Publication No. 2014-5955

SUMMARY OF INVENTION

Technical Problem

Meanwhile, in the configuration in which the auxiliary condensate pump is connected in parallel to the condensate pump, even when one condensate pump stops and the other condensate pump starts immediately, a loss of several seconds occurs until the other condensate pump reaches a steady operation state. Accordingly, a charge pressure with respect to a water supply pump positioned on the downstream side temporarily decreases.

The water supply pump is designed according to the charge pressure of the condensate pump, and an intake pressure of the water supply pump becomes temporarily insufficient during several seconds until the other condensate pump reaches a steady operation state. Accordingly, there is a concern that cavitation may occur in the water supply pump, and it is necessary to stop the water supply pump until the other condensate pump reaches a steady operation state in order to protect the water supply pump.

In a case where the water supply pump is stopped, since the water supply pressure of the boiler decreases, steam is generated in an economizer, and the water supply pressure rapidly increases when the water supply pump is restarted. Accordingly, there is a concern that a water hammer phenomenon may occur as the generated steam is pressed and may cause damage to the equipment.

In addition, in a combined cycle plant, there is a configuration which delivers water via a water supply pump as a cooing source of an air cooler for cooling hot parts of a gas turbine which delivers a flue gas to a boiler. In this configuration, since it becomes temporarily impossible to cool the hot parts of the gas turbine in a case where the water supply pump is stopped, it is necessary to stop the gas turbine in order to secure security.

For example, it is conceivable to install a buffer tank to maintain a pressure between the condensate pump and the water supply pump to solve the above-described problems. However, if the buffer tank is further installed, there is a new problem that the installation cost increases. In addition, there is also a new problem that the degree of freedom in deposition of other equipment decreases due to the further installation of the buffer tank.

The present invention is made to solve the above-described problems, and an object thereof is to provide a boiler, a combined cycle plant, and a boiler operation method capable of maintaining the intake pressure of the water supply pump to an operable pressure.

Solution to Problem

In order to achieve the above-described object, according to a first invention, there is provided a boiler including: a condensate pump; a branch line which causes water delivered by the condensate pump to branch; a drum which is connected to one of two lines into which the branch line branches; and a water supply pump which is connected to the other of the two lines into which the branch line branches and pumps water to an evaporator, wherein the boiler is provided with means for guiding a portion of the water in the drum to the water supply pump side in a case where an inlet side pressure of the water supply pump has become lower than a predetermined pressure.

According to the boiler, when the intake pressure on the inlet side of the water supply pump has become lower than the predetermined pressure due to some causes, since a portion of the water in the drum is guided to the water supply pump side, it is possible to prevent the intake pressure of the water supply pump from decreasing using the pressure in the drum. As a result, it is possible to maintain the intake pressure of the water supply pump to an operable pressure.

Moreover, in a boiler according to a second invention, in the first invention, the means includes a bypass line which bypasses a portion of the branch line and connects the drum and the inlet side of the water supply pump to each other, and a check valve which is provided in the bypass line and allows the water to flow only from the drum side to the water supply pump side.

According to the boiler, when the intake pressure on the inlet side of the water supply pump has become lower than the predetermined pressure, it is possible to automatically perform the action of guiding a portion of the water in the drum to the water supply pump side by a pressure difference without involving control.

Moreover, in a boiler according to a third invention, in the second invention, an inner diameter of a path from the drum to the inlet side of the water supply pump which includes the bypass line is larger than an inner diameter of a path from a branch portion of the branch line to the outlet side of the condensate pump which does not include the bypass line.

According to the boiler, since the inner diameter of the path which guides a portion of the water in the drum to the water supply pump side is larger than those of other paths, it is possible to reduce a pressure loss when guiding a portion of the water in the drum to the water supply pump side, and thus to secure a pressure applied for maintaining the intake pressure of the water supply pump.

In addition, in a boiler according to a fourth invention, in the second or third invention, a check valve which allows water from only the condensate pump side to flow is provided in a path to the outlet side of the condensate pump except for the path from the drum to the inlet side of the water supply pump including the bypass line.

According to the boiler, when a portion of the water in the drum is guided to the water supply pump side, the check valve prevents a portion of the water in the drum from being guided to other paths. Accordingly, it is possible to reduce the pressure loss when guiding a portion of the water in the drum to the water supply pump side, and thus to secure the pressure applied for maintaining the intake pressure of the water supply pump.

Moreover, in a boiler of a fifth invention, in the first invention, the means includes a flow regulation valve which is provided in the one of the two lines into which the branch line branches, a detection unit which detects that the inlet side pressure of the water supply pump has become lower than a predetermined pressure, and a controller which controls the flow regulation valve to be fully opened in a case where the detection unit detects that the inlet side pressure of the water supply pump has become lower than the predetermined pressure.

According to the boiler, it is possible to perform the action of guiding a portion of the water in the drum to the water supply pump side when the intake pressure on the inlet side of the water supply pump has become lower than the predetermined pressure.

Moreover, in a boiler of a sixth invention, in the fifth invention, a check valve which allows the water from only the condensate pump side to flow is provided in the path from the branch portion of the branch line to the outlet side of the condensate pump.

According to the boiler, when a portion of the water in the drum is guided to the water supply pump side, the check valve prevents a portion of the water in the drum from being guided to other paths. Accordingly, it is possible to reduce the pressure loss when guiding a portion of the water in the drum to the water supply pump side, and thus to secure the pressure applied for maintaining the intake pressure of the water supply pump.

Moreover, in a boiler of a seventh invention, in any one of claims 1 to 6, multiple condensate pumps are arranged in parallel and provided so as to be selectively switched, and the means guides a portion of the water in the drum to the water supply pump side when the multiple condensate pumps are switched.

According to the boiler, particularly when the multiple condensate pumps arranged in parallel are switched, it is possible to prevent the intake pressure of the water supply pump from decreasing.

Moreover, according to an eighth invention, there is provided a combined cycle plant including: a gas turbine; the boiler according to any one of the first to seventh inventions having a flue gas discharged from the gas turbine as a heat source; a steam turbine which is driven by steam generated by the boiler; a condenser which condenses steam via the steam turbine; and a condensate pump which supplies the condensate from the condenser to the boiler.

According to the combined cycle plant, when the intake pressure on the inlet side of the water supply pump has become lower than the predetermined pressure due to some causes, since a portion of the water in the drum is guided to the water supply pump side, it is possible to prevent the intake pressure of the water supply pump from decreasing using the pressure in the drum. Accordingly, it is possible to maintain the intake pressure of the water supply pump to the operable pressure. As a result, it is possible to supply steam to the steam turbine without the need for stopping the water supply pump.

Moreover, according to a ninth invention, there is provided a boiler operation method of branching water delivered by a condensate pump, and guiding water in one branch line to a drum while guiding water in the other branch line to a water supply pump and pumping the water to an evaporator, the method including guiding a portion of the water in the drum to the water supply pump side when an inlet side pressure of the water supply pump has become lower than a predetermined pressure.

According to the steam cooling method of a boiler, when the intake pressure on the inlet side of the water supply pump has become lower than the predetermined pressure due to some causes, since a portion of the water in the drum is guided to the water supply pump side, it is possible to prevent the intake pressure of the water supply pump from decreasing using the pressure in the drum. As a result, it is possible to maintain the intake pressure of the water supply pump to an operable pressure.

Advantageous Effects of Invention

According to the present invention, it is possible to maintain the intake pressure of the water supply pump to the operable pressure.

DESCRIPTION OF EMBODIMENTS

Hereinafter, an embodiment of the present invention will be described in detail with reference to the drawings. However, the present invention is not limited to this embodiment. In addition, components of the following embodiment include a component which can be replaced or is easily replaced by a person skilled in the art, or approximately the same component.

Figure 1:
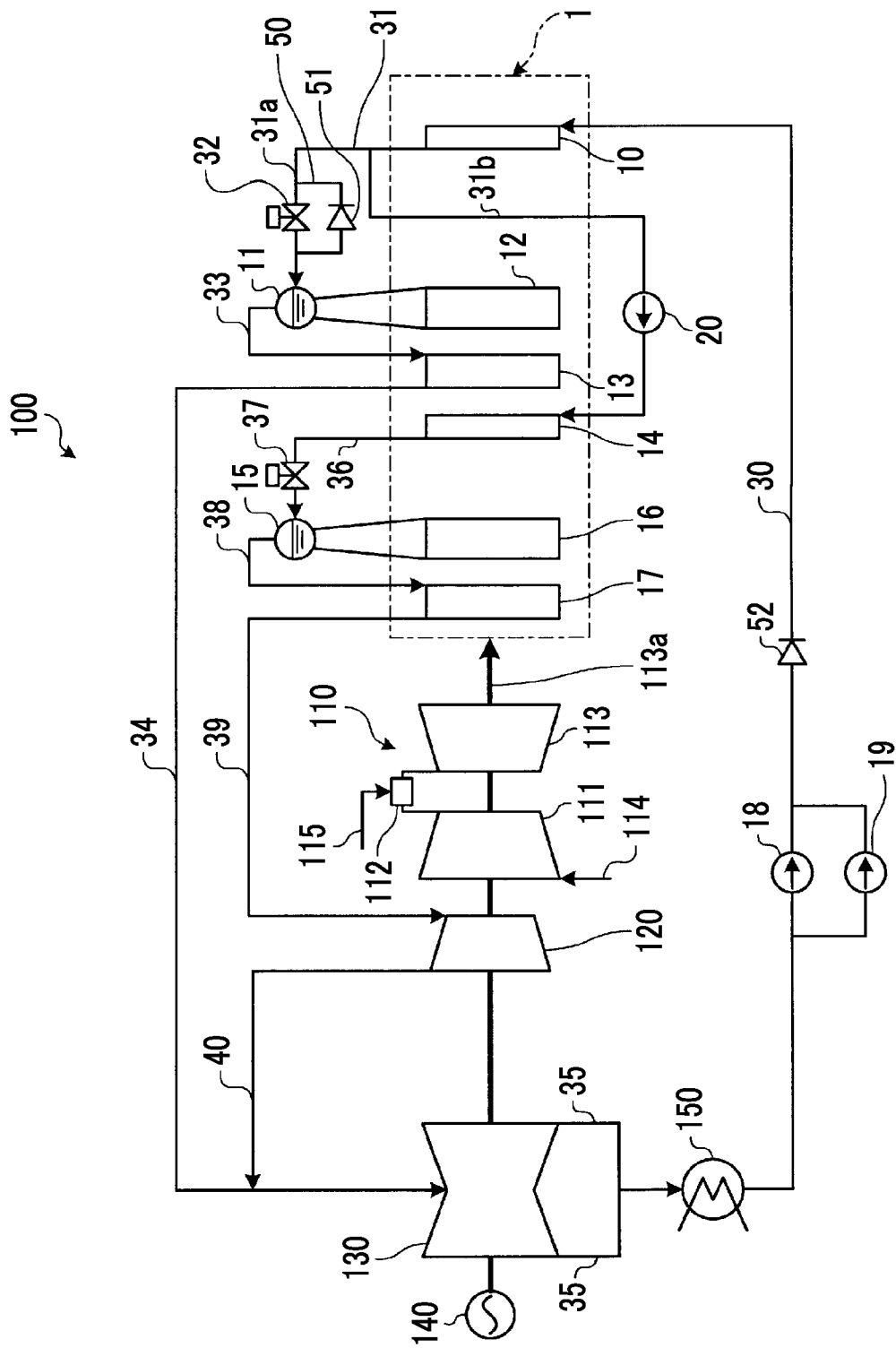
FIG. 1 is a schematic configuration view showing an example of a boiler according to an embodiment of the present invention.

FIG. 1 is a schematic configuration view showing an example of a boiler according to the present embodiment. For example, as shown in FIG. 1, a boiler 1 of the present embodiment is applied to a combined cycle plant 100. The combined cycle plant 100 shown in FIG. 1 is configured of a gas turbine 110, a high-pressure steam turbine 120, and a low-pressure steam turbine 130, and the gas turbine 110, the high-pressure steam turbine 120, and the low-pressure steam turbine 130 are coaxially disposed with a generator 140.

The gas turbine 110 includes a compressor 111, a combustor 112, and a turbine 113. In the compressor 111, compressor inlet air 114 is pressured to be supplied to the combustor 112. In the combustor 112, a high-temperature combustion gas is generated by the supplied air and a fuel 115 to be supplied to the turbine 113. After the combustion gas passing through the turbine 113 rotates the turbine 113, the combustion gas is discharged as a flue gas.

The boiler 1 of the present embodiment is configured as an exhaust heat recovery boiler, and the boiler 1 generates superheated steam from water using the flue gas discharged from the turbine 113 in the gas turbine 110 as a heat source. The high-pressure steam turbine 120 and the low-pressure steam turbine 130 which are steam turbines are driven by the superheated steam. In addition, the gas turbine 110, the high-pressure steam turbine 120, and the low-pressure steam turbine 130 are driven, and thereby electricity is generated by the generator 140. In addition, the steam used in the low-pressure steam turbine 130 is condensed by a condenser 150 connected to the low-pressure steam turbine 130, and the condensate is delivered to the boiler 1 as water so as to generate the superheated steam.

The boiler 1 is connected to a flue 113*a* which is provided on the exhaust side of the turbine 113 in the gas turbine 110. In the boiler 1, a low-pressure economizer 10, a low-pressure drum 11, a low-pressure evaporator 12, a low-pressure superheater 13, a high-pressure economizer 14, a high-pressure drum 15, a high-pressure evaporator 16, and a high-pressure superheater 17 are provided from the downstream side in the flow of the flue gas, and a condensate pump 18, an auxiliary condensate pump 19, and a water supply pump 20 are provided.

The boiler 1 includes a low pressure system which generates low-pressure superheated steam to drive the low-pressure steam turbine 130, and a high pressure system which generates high-pressure superheated steam to drive the high-pressure steam turbine 120. In addition, the low pressure system is configured of the low-pressure economizer 10, the low-pressure drum 11, the low-pressure evaporator 12, the low-pressure superheater 13, the condensate pump 18, and the auxiliary condensate pump 19, and the high pressure system is configured of the high-pressure economizer 14, the high-pressure drum 15, the high-pressure evaporator 16, the high-pressure superheater 17, and the water supply pump 20.

In the low pressure system, the low-pressure economizer 10 is connected to the condenser 150 by a connection line 30. The condensate pump 18 and the auxiliary condensate pump 19 are provided in the connection line 30. The condensate pump 18 and the auxiliary condensate pump 19 are disposed so as to be connected to the connection line 30 and arranged in parallel to each other. In addition, one condensate pump (condensate pump 18) and the other condensate pump (auxiliary condensate pump 19) are used so as to be selectively switched. In the present embodiment, two condensate pumps, the condensate pump 18 and the auxiliary condensate pump 19, are shown. However, two or more condensate pumps may be arranged in parallel and may be provided so as to be selectively switched. That is, in the present embodiment, multiple condensate pumps are arranged in parallel and are provided so as to be selectively switched. In addition, the low-pressure economizer 10 is connected to the low-pressure drum 11 by a low-pressure branch line 31*a* which is one of two lines branched from the branch line 31. A flow regulation valve is provided in an intermediate portion of the low-pressure branch line 31*a*. The low-pressure drum 11 is connected to the low-pressure evaporator 12. Moreover, the low-pressure drum 11 is connected to the low-pressure superheater 13 by a connection line 33. The low-pressure superheater 13 is connected to the inlet side of low-pressure steam turbine 130 by a connection line 34. The outlet side of the low-pressure steam turbine 130 is connected to the condenser 150 by a connection line 35.

That is, in the low pressure system, water (condensate) of the condenser 150 flows into the low-pressure economizer 10 via the connection line 30 by the condensate pump (condensate pump 18 or auxiliary condensate pump 19) so as to be heated, and the water flows into the low-pressure drum 11 via the flow regulation valve 32 through the low-pressure branch line 31*a* of the branch line 31. The water supplied to the low-pressure drum 11 is evaporated by the low-pressure evaporator 12 so as to be saturated steam, is returned to the low-pressure drum 11, and is delivered to the low-pressure superheater 13 via the connection line 33. The saturated steam is superheated by the low-pressure superheater 13, and the superheated steam is supplied to the low-pressure steam turbine 130 via the connection line 34. The steam which drives the low-pressure steam turbine 130 and is discharged is guided to the condenser 150 via the connection line 35 so as to be water (condensate), and the condensate is delivered to the low-pressure economizer via the connection line 30 by the condensate pump (condensate pump 18 or auxiliary condensate pump 19).

In the high pressure system, the high-pressure economizer 14 is connected to the low-pressure economizer 10 by a high-pressure branch line 31*b* which is the other of two lines branched from the branch line 31. The water supply pump 20 is provided in the high-pressure branch line 31*b*. In addition, the high-pressure economizer 14 is connected to the high-pressure drum 15 by a connection line 36. A flow regulation valve 37 is provided in an intermediate portion of the connection line 36. The high-pressure drum 15 is connected to the high-pressure evaporator 16. In addition, the high-pressure drum 15 is connected to the high-pressure superheater 17 by a connection line 38. The high-pressure superheater 17 is connected to the inlet side of the high-pressure steam turbine 120 by a connection line 39. The outlet side of the high-pressure steam turbine 120 is connected to the inlet side of the low-pressure steam turbine 130 by a connection line 40.

That is, in the high pressure system, water heated by the low-pressure economizer 10 flows into the high-pressure economizer 14 via the high-pressure branch line 31*b* of the branch line 31 by the water supply pump 20 so as to be further heated, and further flows into the high-pressure drum 15 through the flow regulation valve 37 via the connection line 36. The water supplied to the high-pressure drum 15 is evaporated by the high-pressure evaporator 16 so as to be saturated steam, is returned to the high-pressure drum 15, and is delivered to the high-pressure superheater 17 via the connection line 38. The saturated steam is superheated by the high-pressure superheater 17, and the superheated steam is supplied to the high-pressure steam turbine 120 via the connection line 39. The steam which drives the high-pressure steam turbine 120 and is discharged is supplied to the low-pressure steam turbine 130 via the connection line 40.

In this boiler 1, pressure applying means is provided. The pressure applying means guides a portion of the water in the low-pressure drum 11 to the water supply pump 20 side in a case where the inlet side pressure of the water supply pump 20 has become lower than a predetermined pressure.

Specifically, the pressure applying means includes a bypass line 50 and a check valve 51. The bypass line 50 bypasses the branch line 31 and is connected to the low-pressure drum 11 and the inlet side of the water supply pump 20. The check valve 51 is provided in the bypass line 50 and allows water to flow only from the low-pressure drum 11 side to the water supply pump 20 side. FIG. 1 shows an aspect in which the bypass line 50 is provided so as to bypass the position of the flow regulation valve 32 in the low-pressure branch line 31*a* which is one of the two lines branched from the branch line 31. In addition, although it is not shown in the drawings, the end portion of the bypass line 50 on the water supply pump 20 side may be connected to the high-pressure branch line 31*b* which is the other of the two lines branched from the branch line 31. Moreover, although it is not shown in the drawings, the end portion of the bypass line 50 on the low-pressure drum 11 side may be connected to the low-pressure drum 11 separately from the branch line 31.

Figure 2:
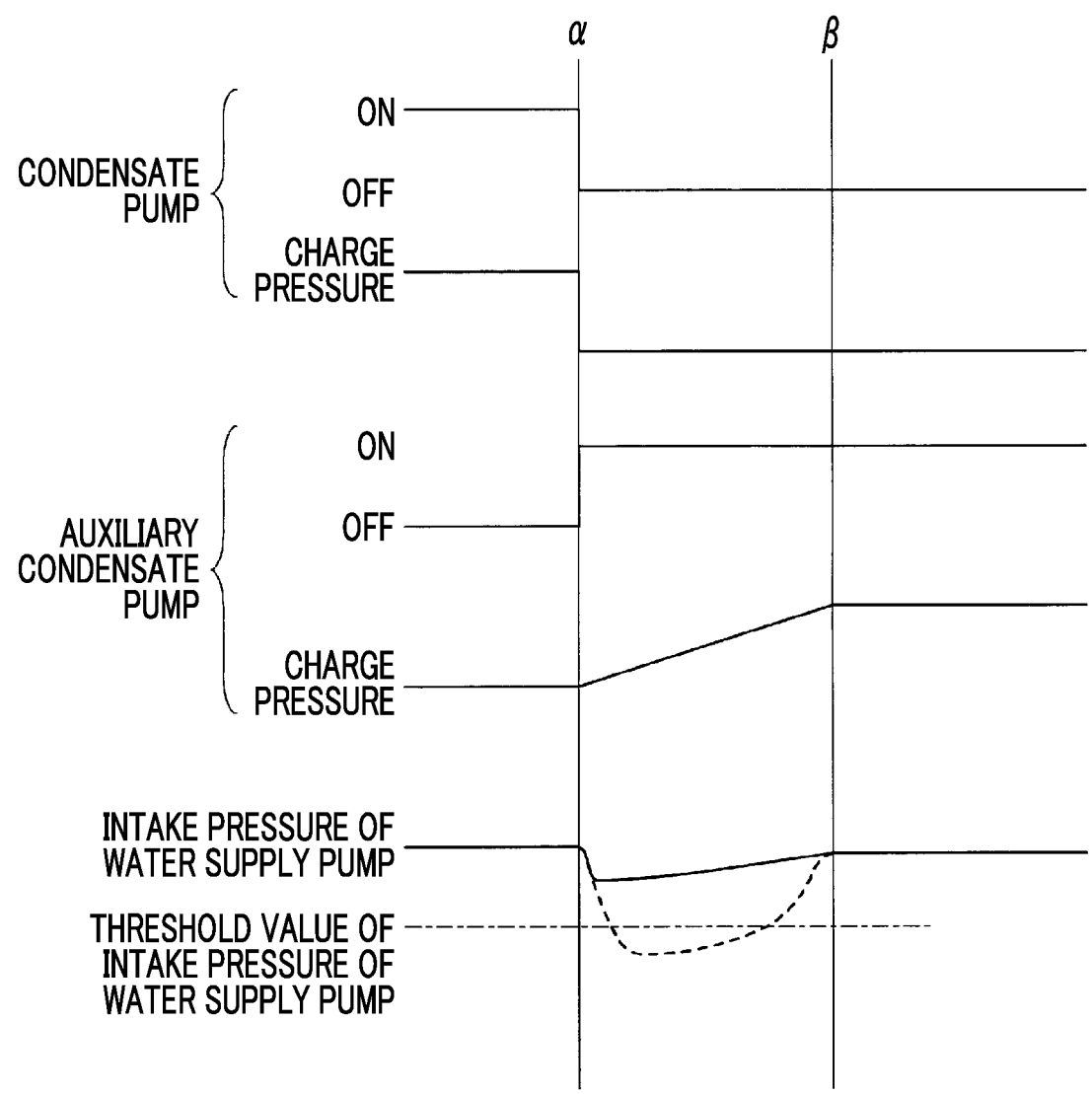
FIG. 2 is a time chart showing operational actions of the boiler according to the embodiment of the present invention.

As shown in a time chart showing the operational actions of the boiler according to the present embodiment in FIG. 2, for example, the pressure applying means having this configuration switches the pump from the condensate pump 18 to the auxiliary condensate pump 19 in an operation state where the condensate pump 18 is used and the auxiliary condensate pump 19 is not used. In this case, as shown in FIG. 2, an OFF signal of the active condensate pump 18 and an ON signal of the stopped auxiliary condensate pump 19 are output at a time point α. At the time point α, the active condensate pump 18 is stopped, and a charge pressure generated by the condensate pump 18 becomes zero. Meanwhile, the stopped auxiliary condensate pump 19 starts operation. However, the charge pressure generated by the auxiliary condensate pump 19 gradually increases from zero and becomes a charge pressure at the time of a steady operation at a time point β. The time from α to β is a few seconds (approximately two seconds).

In addition, as shown in FIG. 2, since the charge pressure generated by the condensate pump 18 decreases, the intake pressure of the water supply pump 20 decreases from α to β. Here, as shown by a broken line in FIG. 2, in a case where the pressure applying means is not provided, the intake pressure of the water supply pump 20 becomes lower than a threshold value at which the water supply pump 20 can be activated. Accordingly, it is necessary to stop the water supply pump 20 until the auxiliary condensate pump 19 reaches the steady operation state so as to protect the water supply pump 20. By contrast, in a case where the pressure applying means is provided as in the present embodiment, as the charge pressure generated by the condensate pump 18 decreases, the charge pressure having been generated to supply water to the low-pressure drum 11 until then becomes lower than the pressure in the low-pressure drum 11, so that the water in the low-pressure drum 11 is pumped from the low-pressure drum 11 toward the water supply pump 20 via the check valve 51 through the bypass line 50. Accordingly, as shown by a solid line in FIG. 2, the intake pressure of the water supply pump 20 exceeds the threshold value at which the water supply pump 20 can be activated, and it is possible to continuously operate the water supply pump 20.

The above-described operational actions of the boiler is similarly applied to a case where the pump is switched from the auxiliary condensate pump 19 to the condensate pump 18. In addition, even in a case where one condensate pump is provided, when the charge pressure generated by the condensate pump temporarily decreases due to some causes, the water in the low-pressure drum 11 is similarly pumped from the low-pressure drum 11 toward the water supply pump 20 via the check valve 51 through the bypass line 50.

In this way, the boiler 1 of the present embodiment includes the condensate pumps (the condensate pump 18 and the auxiliary condensate pump 19), the branch line 31 which causes water delivered by the condensate pump to branch, the drum (low-pressure drum 11) which is connected to the one (low-pressure branch line 31a) of the two lines into which the branch line 31 branches, the water supply pump 20 which is connected to the other (high-pressure branch line 31b) of the two lines into which the branch line 31 branches and pumps water to the evaporator (high-pressure evaporator 16), and the pressure applying means for guiding a portion of the water in the drum to the water supply pump 20 side in the case where the intake pressure on the inlet side of the water supply pump 20 has become lower than a predetermined pressure.

According to the boiler 1, when the intake pressure on the inlet side of the water supply pump 20 has become lower than the predetermined pressure due to some causes, since a portion of the water in the drum is guided to the water supply pump 20 side, it is possible to prevent the intake pressure of the water supply pump 20 from decreasing using the pressure in the drum. As a result, it is possible to maintain the intake pressure of the water supply pump 20 to an operable pressure.

In addition, in the boiler 1 of the present embodiment, the pressure applying means includes the bypass line 50 which bypasses a portion of the branch line and connects the drum (low-pressure drum 11) and the inlet side of the water supply pump 20 to each other, and the check valve 51 which is provided in the bypass line 50 and allows the water to flow only from the drum side to the water supply pump 20 side. Accordingly, when the intake pressure on the inlet side of the water supply pump 20 has become lower than the predetermined pressure, it is possible to automatically perform the action of guiding a portion of the water in the drum to the water supply pump 20 side by a pressure difference without involving control.

Moreover, in the boiler 1 of the present embodiment, preferably, an inner diameter of a path from the drum (low-pressure drum 11) to the inlet side of the water supply pump 20 which includes the bypass line 50 is larger than an inner diameter of a path from a branch portion of the branch line 31 to the outlet side of the condensate pump (condensate pump 18 and auxiliary condensate pump 19) which does not include the bypass line 50. Accordingly, since the inner diameter of the path which guides a portion of the water in the drum to the water supply pump side is larger than those of other paths, it is possible to reduce a pressure loss when guiding a portion of the water in the drum to the water supply pump 20 side, and thus to secure a pressure applied for maintaining the intake pressure of the water supply pump 20.

Moreover, preferably, the boiler 1 of the present embodiment includes a check valve 52 which allows water from only the condensate pump side to flow is provided in a path to the outlet side of the condensate pump (condensate pump 18 and auxiliary condensate pump 19) except for the path from the drum (low-pressure drum 11) to the inlet side of the water supply pump 20 including the bypass line 50. In addition, FIG. 1 shows the example in which the check valve 52 is provided in the connection line 30. Accordingly, when a portion of the water in the drum is guided to the water supply pump 20 side, the check valve 52 prevents a portion of the water in the drum from being guided to other paths. Accordingly, it is possible to reduce the pressure loss when guiding a portion of the water in the drum to the water supply pump 20 side, and thus to secure the pressure applied for maintaining the intake pressure of the water supply pump 20.

Moreover, in the boiler 1 of the present embodiment, multiple condensate pumps (condensate pump 18 and auxiliary condensate pump 19) are arranged in parallel and provided so as to be selectively switched, and the pressure applying means guides a portion of the water in the drum (low-pressure drum 11) to the water supply pump 20 side when the multiple condensate pumps are switched. Accordingly, particularly when the multiple condensate pumps arranged in parallel are switched, it is possible to prevent the intake pressure of the water supply pump 20 from decreasing.

In addition, in the boiler 1 of the present embodiment, preferably, the water supply pump 20 is provided at a lower position than that of the drum (low-pressure drum 11). Accordingly, it is possible to secure the pressure applied for maintaining the intake pressure of the water supply pump 20 by a water head difference between the water supply pump 20 and the drum.

Figure 3:
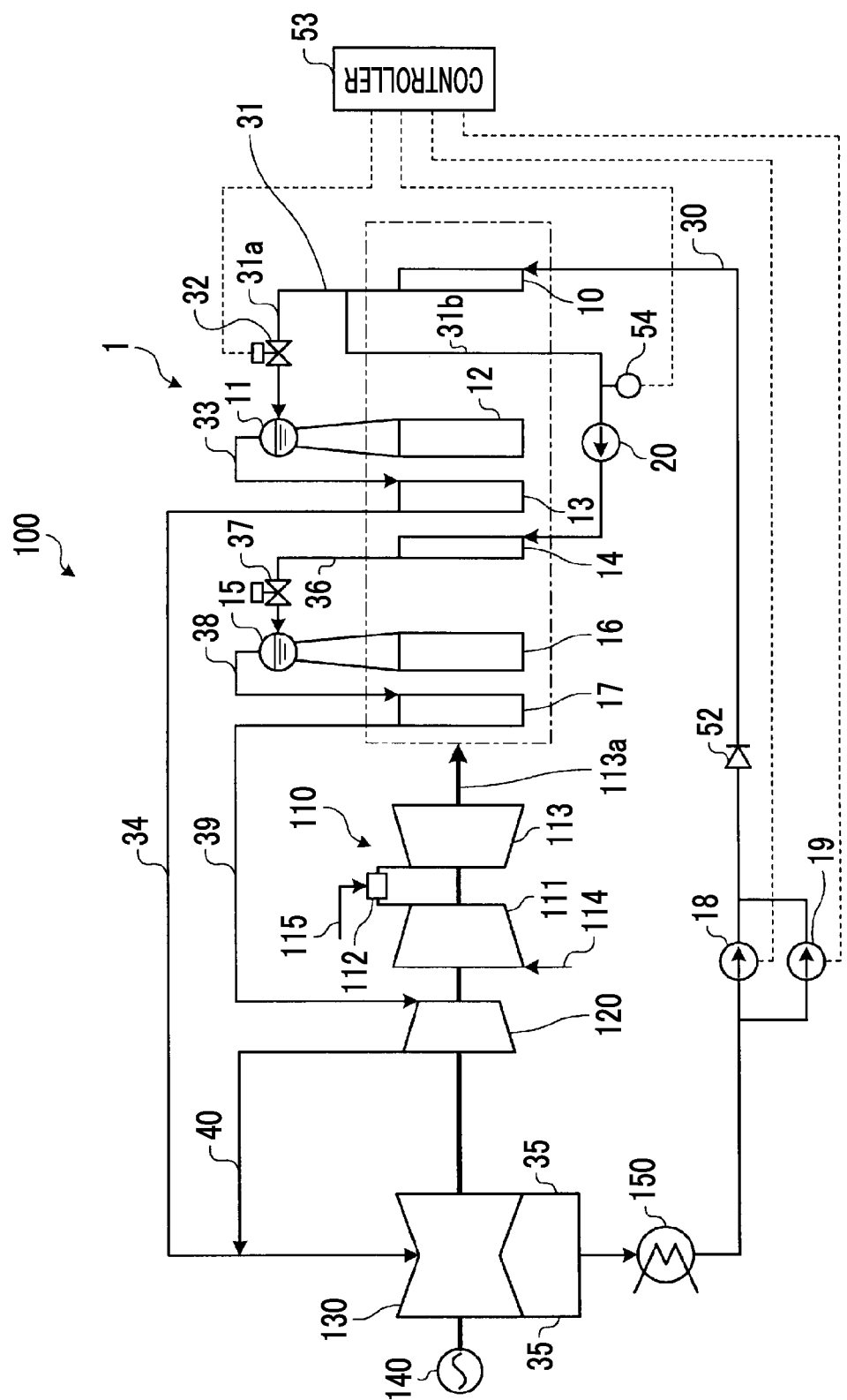
FIG. 3 is a schematic configuration view showing another example of the boiler according to the embodiment of the present invention.

Meanwhile, FIG. 3 is a schematic configuration view showing another example of the boiler of the present embodiment. In the combined cycle plant 100 shown in FIG. 3, the pressure applying means is different from that of the above-described configuration shown in FIG. 2. In descriptions of FIG. 3, the same reference numerals are assigned to the same components as those of FIG. 1, and descriptions thereof are omitted.

The pressure applying means shown in FIG. 3 includes the flow regulation valve 32, a detection unit, and a controller 53. The flow regulation valve 32 is disposed in the one (low-pressure branch line 31a) of the two lines branched from the branch line 31. The detection unit detects that the inlet side pressure of the water supply pump 20 has become lower than the predetermined pressure, and in FIG. 3, the detection unit is a pressure detector 54 which is positioned on the inlet side of the water supply pump 20 in the other (high-pressure branch line 31b) of the two lines branched from the branch line 31. The controller 53 is electrically connected to the detection unit, and controls the flow regulation valve 32 to be fully opened in a case where the detection unit detects that the intake pressure on the inlet side of the water supply pump 20 has become lower than the predetermined pressure. In addition, the controller 53 controls the flow regulation valve 32 to be in a predetermined opening state in a case where the detection unit detects that the intake pressure on the inlet side of the water supply pump 20 has become the predetermined pressure which is set in advance. The predetermined opening state is the opening of the flow regulation valve 32 corresponding to the time of a steady operation of the boiler 1 and is set in advance.

In addition, the controller 53 controls the activation and stopping of the condensate pump (condensate pump 18 and auxiliary condensate pump 19), that is, controls switching of the multiple condensate pumps which are arranged in parallel. Accordingly, as a detection unit substituting the pressure detector 54, inputting the signal indicating that the active condensate pump has stopped into the controller 53 may be regarded as detecting that the inlet side pressure of the water supply pump 20 has become lower than the predetermined pressure due to the decrease of the charge pressure generated by the stopped condensate pump. In this case, the controller previously stores the time until the activated condensate pump reaches a steady operation state after the signal indicating that the stopped condensate pump has been activated is input into the controller 53, and controls the flow regulation valve 32 to be in a predetermined opening state in a case where the stored time elapses.

If the charge pressure generated by the condensate pump decreases due to some causes, the intake pressure of the water supply pump 20 decreases. Accordingly, the pressure applying means shown in FIG. 3 causes the flow regulation valve 32 to be fully opened. As the charge pressure generated by the condensate pump 18 decreases, the charge pressure having been generated to supply water to the low-pressure drum 11 until then becomes lower than the pressure in the low-pressure drum 11, so that the water in the low-pressure drum 11 is pumped from the low-pressure drum 11 toward the water supply pump 20 via the flow regulation valve 32. Accordingly, as shown by the solid line in FIG. 2, the intake pressure of the water supply pump 20 exceeds the threshold value at which the water supply pump 20 can be activated, and it is possible to continuously operate the water supply pump 20.

Therefore, even in the configuration which includes the flow regulation valve 32, the detection unit, and the controller 53 as the pressure applying means shown in FIG. 3, when the intake pressure on the inlet side of the water supply pump 20 has become lower than the predetermined pressure, it is possible to perform the action of guiding a portion of the water in the drum (low-pressure drum 11) to the water supply pump 20 side.

Moreover, preferably, the boiler 1 including the pressure applying means shown in FIG. 3 includes the check valve 52 which allows the water from only the condensate pump side to flow in the path from the branch portion of the branch line 31 to the outlet side of the condensate pump (condensate pump 18 and auxiliary condensate pump 19). In addition, FIG. 3 shows the example in which the check valve 52 is provided in the connection line 30. Accordingly, when a portion of the water in the drum (low-pressure drum 11) is guided to the water supply pump 20 side, the check valve 52 prevents a portion of the water in the drum from being guided to other paths. Accordingly, it is possible to reduce the pressure loss when guiding a portion of the water in the drum to the water supply pump side, and thus to secure the pressure applied for maintaining the intake pressure of the water supply pump 20.

REFERENCE SIGNS LIST

1: boiler
18: condensate pump
19: auxiliary condensate pump
20: water supply pump
31: branch line
31a: low-pressure branch line
31b: high-pressure branch line
32: flow regulation valve
50: bypass line
51: check valve
52: check valve
53: controller
54: pressure detector
100: combined cycle plant
110: gas turbine
120: high-pressure steam turbine
130: low-pressure steam turbine
150: condenser

The invention claimed is:

1. A boiler comprising:
a condensate pump;
a branch line which causes water delivered by the condensate pump to branch;
a drum which is connected to one of two lines into which the branch line branches;
a water supply pump which is connected to the other of the two lines into which the branch line branches, the water supply pump being configured to pump water to an economizer;
a bypass line which bypasses a portion of the branch line and connects the drum and the inlet side of the water supply pump to each other; and a check valve which is provided in the bypass line and allows the water to flow only from the drum side to the water supply pump side, wherein the boiler is provided with means for guiding a portion of the water in the drum with a pressure higher than a pressure on an inlet side of the water supply pump to the water supply pump side via the check valve by a pressure difference in a case where an intake pressure of the water supply pump has become lower than a predetermined pressure due to a charge pressure generated by the condensate pump decreasing during operation of the condensate pump and the water supply pump.

2. The boiler according to claim 1, wherein an inner diameter of a path from the drum to the inlet side of the water supply pump which includes the bypass line is larger than an inner diameter of a path from a branch portion of the branch line to the outlet side of the condensate pump which does not include the bypass line.

3. The boiler according to claim 1, wherein a check valve which allows water from only the condensate pump side to flow is provided in a path to the outlet side of the condensate pump except for the path from the drum to the inlet side of the water supply pump including the bypass line.

4. The boiler according to claim 1,
wherein the means for guiding includes:
a flow regulation valve which is provided in the one of the two lines into which the branch line branches;
a detection unit which detects that the inlet side pressure of the water supply pump has become lower than a predetermined pressure; and
a controller which controls the flow regulation valve to be fully opened in a case where the detection unit detects that the inlet side pressure of the water supply pump has become lower than the predetermined pressure.

5. The boiler according to claim 4, wherein a check valve which allows the water from only the condensate pump side to flow is provided in the path from the branch portion of the branch line to the outlet side of the condensate pump.

6. The boiler according to claim 1, wherein multiple condensate pumps are arranged in parallel and provided so as to be selectively switched, and the means for guiding guides a portion of the water in the drum to the water supply pump side when the multiple condensate pumps are switched.

7. A combined cycle plant comprising:
a gas turbine;
the boiler according to claim 1 having a flue gas discharged from the gas turbine as a heat source;
a steam turbine which is driven by steam generated by the boiler;
a condenser which condenses steam via the steam turbine; and
a condensate pump which supplies the condensate from the condenser to the boiler.

8. A boiler operation method of branching water delivered by a condensate pump, and guiding water in one branch line to a drum while guiding water in the other branch line to a water supply pump and pumping the water to an economizer, wherein the boiler comprises:
the condensate pump;
a branch line which causes water delivered by the condensate pump to branch;
the drum which is connected to one of two lines into which the branch line branches;
the water supply pump which is connected to the other of the two lines into which the branch line branches, the water supply pump being configured to pump water to the economizer;
a bypass line which bypasses a portion of the branch line and connects the drum and the inlet side of the water supply pump to each other; and
a check valve which is provided in the bypass line and allows the water to flow only from the drum side to the water supply pump side,
the method comprising:
guiding a portion of the water in the drum with a pressure higher than a pressure on an inlet side of the water supply pump to the water supply pump side via the check valve by a pressure difference when an intake pressure of the water supply pump has become lower than a predetermined pressure due to a charge pressure generated by the condensate pump decreasing during operation of the condensate pump and the water supply pump.

* * * * *